US012756085B2

(12) United States Patent

Kwon

(10) Patent No.: US 12,756,085 B2

(45) Date of Patent: Oct. 6, 2026

(54) GLASS ANTENNA FOR VEHICLE

(71) Applicants: Hyundai Motor Company, Seoul (KR); Kia Corporation, Seoul (KR)

(72) Inventor: Oh Yun Kwon, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 33 days.

(21) Appl. No.: 18/971,369

(22) Filed: Dec. 6, 2024

(65) Prior Publication Data

US 2025/0309519 A1 Oct. 2, 2025

(30) Foreign Application Priority Data

Apr. 2, 2024 (KR) ........................ 10-2024-0044468

(51) Int. Cl.

*H01Q 1/12* (2006.01)
*B60J 1/18* (2006.01)
*B60R 1/26* (2022.01)
*H01Q 1/38* (2006.01)
*H01Q 5/307* (2015.01)

(52) U.S. Cl.

CPC ............. *H01Q 1/1278* (2013.01); *B60R 1/26* (2022.01); *H01Q 1/38* (2013.01); *H01Q 5/307* (2015.01); *B60J 1/18* (2013.01)

(58) Field of Classification Search

CPC ........ H01Q 1/1278; H01Q 1/38; H01Q 5/307; H01Q 1/1271

See application file for complete search history.

(56) References Cited

U.S. PATENT DOCUMENTS

| | | | | |
|---|---|---|---|---|
| 2008/0284850 A1* | 11/2008 | Blaesing | ............... | B60S 1/0844 348/148 |
| 2011/0043419 A1* | 2/2011 | Noguchi | ............. | H01Q 1/1278 343/712 |
| 2016/0344088 A1* | 11/2016 | Takeuchi | ............. | H01Q 1/1271 |

* cited by examiner

*Primary Examiner* — Dieu Hien T Duong

(74) *Attorney, Agent, or Firm* — Fox Rothschild LLP

(57) ABSTRACT

A glass antenna including: a transparent antenna unit which is formed on an upper portion of a glass for a vehicle and configured to allow light to pass therethrough; a heating antenna unit which is formed to be spaced at a predetermined distance apart from a lower portion of the transparent antenna unit and configured to be capacitively coupled with the transparent antenna unit; a plurality of vertical patterns which intersects with the heating antenna unit; and a pair of busbars disposed in both sides of the heating antenna unit, wherein the transparent antenna unit includes: a plurality of transparent conductive patterns transparently formed to allow light to pass therethrough; and a plurality of feeding units connected to each of the plurality of transparent conductive patterns.

11 Claims, 5 Drawing Sheets

GLASS ANTENNA FOR VEHICLE

CROSS-REFERENCE TO RELATED APPLICATIONS

The present application claims under 35 U.S.C. § 119(a) the benefit of Patent Application No. 10-2024-0044468, filed on Apr. 2, 2024, in Korea, the entire contents of which are incorporated herein by reference.

BACKGROUND

Technical Field

The present disclosure relates to a glass antenna for a vehicle.

Background

The content described in this section simply provides background information regarding the present disclosure but does not configure the related art.

FIG. 1 is a drawing showing conventional antennas mounted on a vehicle.

Referring to FIG. 1, in the conventional case, a vehicle may include a roof antenna 100 and a glass antenna 130.

As services provided through a vehicle diversify, various kinds of antennas are mounted on a vehicle. The roof antenna 100 is an antenna mounted on the roof of the vehicle. In many cases, the roof antenna 100 is manufactured in a shape similar to that of a shark's fin, and hence, it is called a shark fin antenna.

The glass antenna 130 is an antenna mounted on a glass (or, a windshield) 110 of the vehicle. Unlike general antennas which are exposed to the outside and easily identified, the glass antenna 130 may not be easily identified as an antenna because it is formed integrally with a heating wire of a glass 110 of the vehicle. The glass antenna 130 does not spoil the aesthetics of the vehicle, thereby enhancing an overall aesthetic appearance of the vehicle. The glass antenna 130 uses the glass 110 of the vehicle as a substrate and patterns a thin metal wire onto the glass 110 to implement as an antenna.

In the conventional case, there was a limitation with the glass antenna 130 in securing a blank space 120 without an antenna pattern on top of the glass 110 for operations of a high mount stop lamp (HMSL) and a built-in camera. It is because the presence of an antenna pattern on the glass 110 may disturb the view of the built-in camera.

That is, in the conventional case, there was an issue that an area to install an antenna in the glass 110 due to the blank area 120 was reduced, and thus, a roof antenna 100 was used so as to resolve this issue. When the roof antenna 100 is used, it is designed to perform wireless communication in different frequency bands from those of the glass antenna 130.

Recently, there is a tendency that the size of the roof antenna 100 is reduced or the roof antenna 100 is removed. It is because the exterior design of the vehicle may be enhanced and air resistance is also reduced when the size of the roof antenna 100 protruded to the outside of the vehicle is reduced or the roof antenna 100 is removed. However, when the size of the roof antenna 100 is reduced or the roof antenna 100 is removed, there is a concern that the frequency bands that vehicles may receive are reduced or communication functions may be deteriorated. For example, when the roof antenna 100 is removed, another antenna may be needed to replace the role of the roof antenna 100. For example, when the size of the roof antenna 100 is reduced, it becomes difficult to suitably dispose many emitters in an interior area of the reduced roof antenna 100. In addition, narrow intervals between emitters can cause interference, which may cause performance degradation of an antenna.

Accordingly, there is a need for a glass antenna capable of performing, instead of a roof antenna, all or some of the functions of the roof antenna 100 so as to reduce the size of the roof antenna 100 or to remove the roof antenna 100.

SUMMARY

In view of the above, in order to solve these issues, an objective of the present disclosure is to provide a glass antenna that enables wireless communication in various frequency bands.

In addition, another objective of the present disclosure is to provide a glass antenna capable of performing all or some of the functions of a roof antenna or assisting the functions of the roof antenna.

In addition, yet another objective of the present disclosure is to provide a transparent antenna that does not block view from the top of a glass antenna.

Objectives to be solved by the present disclosure are not limited to the above-mentioned objectives, and other objectives not mentioned will be clearly understood by those skilled in the art from the following description.

In some embodiments, a glass antenna may include a transparent antenna unit formed on an upper portion of a glass for a vehicle; a heating antenna unit formed to be spaced at a predetermined distance apart from a lower portion of the transparent antenna unit; and a plurality of vertical patterns which intersect with the heating antenna unit. The transparent antenna unit may include a plurality of transparent conductive patterns; and a plurality of feeding units, each connected to a corresponding one of the plurality of transparent conductive patterns.

The plurality of transparent conductive patterns may include a first transparent conductive pattern and a second transparent conductive pattern disposed at a lower portion of the first transparent conductive pattern. The first transparent conductive pattern and the second transparent conductive pattern may be capacitively coupled with each other.

The plurality of transparent conductive patterns may include a first transparent conductive pattern disposed on the left side of the glass and a second transparent conductive pattern disposed on the right side of the glass.

The plurality of transparent conductive patterns may include a first transparent conductive pattern that is configured to receive FM broadcast waves and a second transparent conductive pattern that is configured to receive AM broadcast waves.

The heating antenna unit may include a heating conductive pattern. The plurality of transparent conductive patterns and the heating conductive pattern may be formed of the same metal.

The transparent antenna unit and the heating antenna unit may be capacitively coupled with each other.

A camera module may be disposed so that an optical axis of the camera module passes through at least one of the plurality of transparent conductive patterns.

The heating conductive pattern may be transparently formed to allow light to pass through it.

The plurality of feeding units may be placed at a predetermined distance apart from the optical axis of the camera module.

A pair of busbars may be included.

The pair of busbars may be disposed on both sides of the heating antenna unit.

All or some of the plurality of vertical patterns and/or the heating antenna unit may be transparently formed.

In some embodiments, a glass antenna may include a transparent antenna unit that is formed on an upper portion of a glass for a vehicle; a heating antenna unit that is formed to be spaced at a predetermined distance apart from a lower portion of the transparent antenna unit, and configured to be capacitively coupled with the transparent antenna unit each other; and a plurality of vertical patterns which intersects with the heating antenna unit. The transparent antenna unit may include one transparent conductive pattern formed of an integrated type; and one feeding unit that is disposed at one side of the transparent conductive pattern and connected to the transparent conductive pattern. The heating antenna unit may include a heating conductive pattern. A part of a lower portion of the one transparent conductive pattern may be parallel to the heating conductive pattern.

The glass antenna may further include a roof antenna disposed on the roof of the vehicle.

The glass antenna may further include a pair of busbars.

All or some of the plurality of vertical patterns and/or the heating antenna unit may be transparently formed.

In some embodiments, a glass antenna may include a transparent antenna unit which is formed on an upper portion of a glass for a vehicle and configured to allow light to pass therethrough; a heating antenna unit which is formed to be spaced at a predetermined distance apart from a lower portion of the transparent antenna unit and configured to be capacitively coupled with the transparent antenna unit each other; and a plurality of vertical patterns which intersects with the heating antenna unit. The transparent antenna unit may include a first transparent conductive pattern disposed on a left side of the glass; a second transparent conductive pattern disposed on a right side of the glass; and a plurality of feeding units, each respectively connected to an upper end of the first transparent conductive pattern and an upper end of the second transparent conductive pattern. The heating antenna unit may include a heating conductive pattern, and a part of a lower portion of the first transparent conductive pattern may be parallel to the heating conductive pattern.

The glass antenna may further include a roof antenna disposed on the roof of the vehicle.

The glass antenna may further include a pair of busbars.

All or some of the plurality of vertical patterns and/or the heating antenna unit may be transparently formed.

As described above, according to an embodiment of the present disclosure, it is possible for a glass antenna to perform wireless communication in various frequency bands.

In addition, it is possible for a glass antenna of the present disclosure to perform all or some of the functions of a roof antenna or assist the functions of the roof antenna.

In addition, with a transparent antenna unit disposed on top of a glass antenna, it is possible to make use of a space on top of the glass as an antenna instead of leaving the space empty.

In addition, since a transparent antenna unit can perform all or some of the functions of a roof antenna, it is possible to prevent degradation of the wireless communication performance of the vehicle is not degenerated when the size of a roof antenna is reduced.

As discussed, the method and system suitably include use of a controller or processer.

In another embodiment, vehicles are provided that comprise an apparatus as disclosed herein.

DETAILED DESCRIPTION

Figure 1:
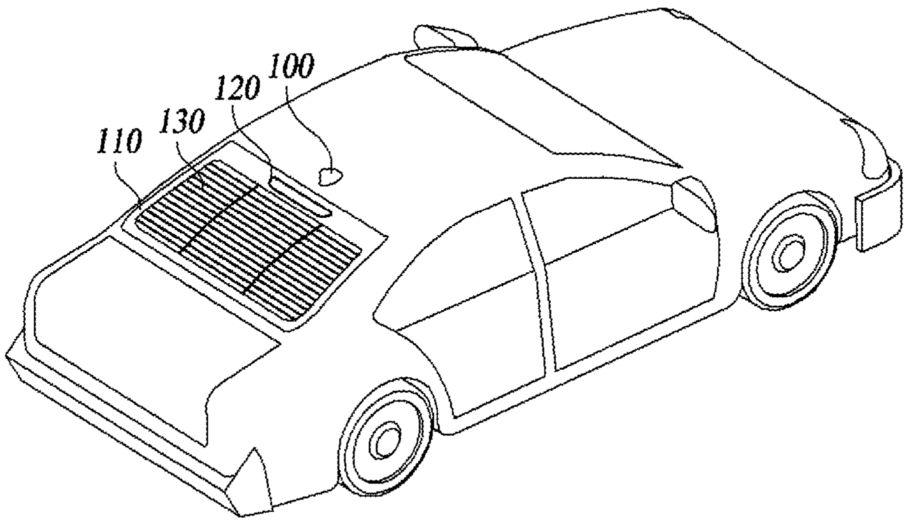
FIG. 1 is a diagram illustrating the structure of a conventional antenna for a vehicle.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

The term 'transparent' means transparency for visible light and includes both clear transparency as well as translucency. Generally, a material or device is considered transparent if at least 20%, generally at least 30%, for example at least 50%, at least 60% or at least 80% of visible light illuminating the material or device can pass through the material. In certain aspects a material is considered transparent if greater than 80%, 90% or 95% of visible light can pass through the material.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Figure 2:
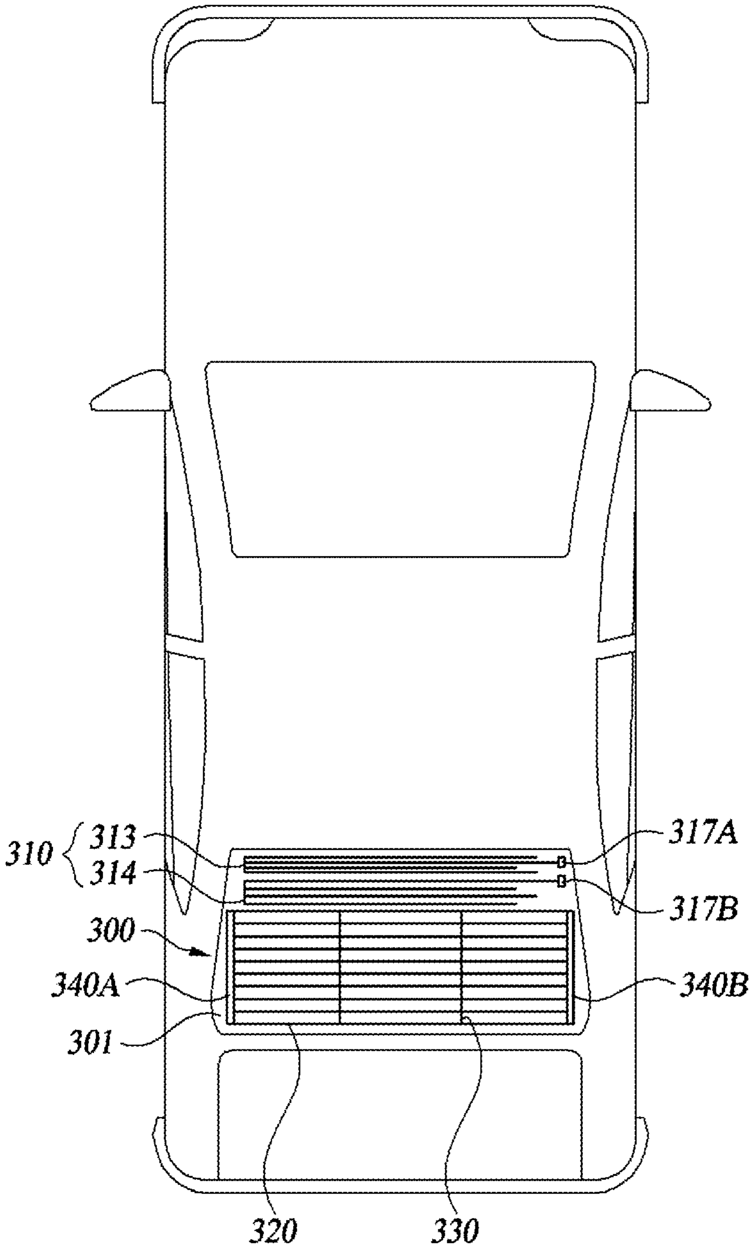
FIG. 2 is a diagram illustrating the structure of a glass antenna according to a first embodiment of the present disclosure.

FIG. 2 is a diagram illustrating the structure of a glass antenna according to a first embodiment of the present disclosure.

Figure 3:
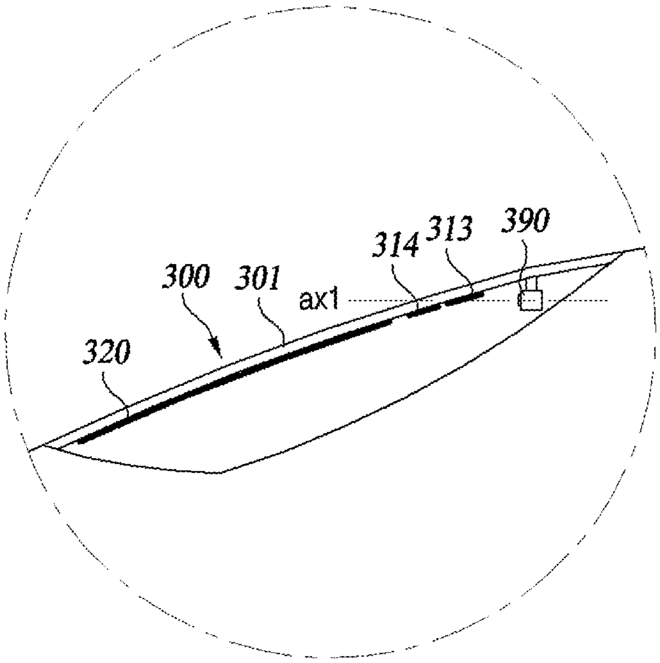
FIG. 3 is a cross sectional view of a glass antenna according to the first embodiment of the present disclosure.

FIG. 3 is a cross sectional view of a glass antenna according to the first embodiment of the present disclosure.

A glass antenna 300 for a vehicle according to the first embodiment among various embodiments of the present disclosure will be first explained. Glass antennas 400 and 500 for a vehicle according to a second embodiment and a third embodiment will be explained later.

Referring to FIGS. 2 and 3, the glass antenna 300 for the vehicle according to the first embodiment of the present disclosure may include a transparent antenna unit 310, a heating antenna unit 320, a plurality of vertical patterns 330, busbars 340 and a camera module 390.

The transparent antenna unit 310 may be formed on an upper portion of a glass 301 of the vehicle. The transparent antenna unit 310 is designed to allow light to pass therethrough. Since light may pass through the transparent antenna unit 310, its presence on an upper portion of the glass 301 of the vehicle may not block a high mount stop lamp (HMSL) and a camera module 390, nor does it interfere with operation thereof. Here, the camera module 390 may be a built-in camera. Shapes and placements of the camera module 390 are not limited by FIG. 3.

The transparent antenna unit 310 may include a plurality of transparent conductive patterns 313 and 314 to allow light to pass therethrough. The plurality of transparent conductive patterns 313 and 314 may include a first transparent conductive pattern 313 and a second transparent conductive pattern 314. Here, the first transparent conductive pattern 313 and the second transparent conductive pattern 314 may be capacitively coupled to each other. The mutual operations between capacitively coupled configurations may improve the efficiency of communication signaling and extend the range of communication. In addition, since a communication performance is enhanced, and thus, even when the size of an overall antenna system is designed to be reduced, the target communication specification is achievable. Accordingly, there are also advantages in that the degree of freedom of design is increased and the manufacturing cost is reduced.

Shapes, sizes, placements, etc. of the first transparent conductive pattern 313 and the second transparent conductive pattern 314 of the plurality of transparent conductive patterns are not limited by the disclosure of the drawings. That is, the first transparent conductive pattern 313 and the second transparent conductive pattern 314 may form patterns which are different from the patterns disclosed in the drawings.

The first transparent conductive pattern 313 may receive FM broadcast waves. The second transparent conductive pattern 314 may receive AM broadcast waves.

The transparent antenna unit 310 may include a plurality of feeding units 317. Each of the plurality of feeding units 317A and 317B is connected with each of the plurality of transparent conductive patterns 313 and 314. The feeding unit 317 disclosed in the drawing is of square shape, but shapes, placements, sizes, numbers, etc. of the feeding unit 317 are not limited by the disclosure of the drawing. That is, the shape of the feeding unit 317 may be of any shape other than square.

Each of the plurality of feeding units 317 may be placed at a predetermined distance apart from an optical axis ax1 of the camera module 390.

Here, the optical axis ax1 of the camera module 390 is an axis which passes through the center of the camera module 390. When each of the plurality of the feeding units 317 is placed at a predetermined distance or more apart from the optical axis ax1 of the camera module 390, the feeding units 317 do not block the view of the camera module 390. This may be applied to the second embodiment and the third embodiment as well.

The heating antenna unit 320 may be formed at a lower portion of the glass 301 of the vehicle. The heating antenna unit 320 may be formed at a lower portion of the transparent antenna unit 310. The heating antenna unit 320 may be formed to be spaced at a predetermined distance apart from the transparent antenna unit 310. For example, the heating antenna unit 320 may be placed apart from a lower portion of the transparent antenna unit 310.

The heating antenna unit 320 may include a plurality of heating conductive patterns which is extendedly formed in a lateral direction. A plurality of transparent conductive patterns 313 and 314 of the transparent antenna unit 310 and the heating conductive pattern of the heating antenna unit 320 may be formed of the same metal. In addition, the heating antenna unit 320 may be capacitively coupled with the transparent antenna unit 310 each other. Between the capacitively coupled configurations, energy may be transmitted by mutual operations without direct contacting each other. Particularly, the feeding unit is not connected to the heating antenna unit 320, but because the heating antenna unit 320 is capacitively coupled with the transparent antenna unit 310, the heating antenna unit 320 is supplied with energy from the transparent antenna unit 310 for operation. That is, non-contact power transmission is possible.

All or some of the heating conductive patterns of the heating antenna unit 320 may be transparently formed to allow light to pass therethrough. In this case, the all or some of the heating conductive patterns are invisible to a user or third party's eyes, resulting an improved overall aesthetic appearance of the vehicle. However, when the heating conductive pattern of the heating conductive antenna unit 320 is transparently designed, it may increase the difficulty and cost of mass production. Thus, it is also possible to design transparently only the transparent conductive patterns 313 and 314 of the transparent antenna unit 310, and not to design transparently the heating conductive pattern of the heating antenna unit 320.

Each of the plurality of vertical patterns 330 may be formed to cross with the heating conductive patterns of the heating antenna unit 320. For example, each of the plurality of vertical patterns 330 may be extendedly formed in a vertical direction of the glass 301 of the vehicle. In FIG. 2, the plurality of vertical patterns 330 is shown to be two patterns, but the number and shapes of the plurality of vertical patterns 330 are not limited by the drawings.

The plurality of vertical patterns 330 may be applied to an antenna matching. By the antenna matching, the glass antenna 300 for the vehicle is possibly radiated at a minimal deviation from needed frequency bands. Thus, the performance of an antenna is greatly improved. In addition, the efficiency, transmission distance, and reception sensitivity of the antenna may be enhanced.

All or some of the plurality of vertical patterns 330 may be transparently formed. In this case, the all or some of the plurality of vertical patterns 330 are invisible to a user or third party's eyes, resulting in an improved overall aesthetic appearance of the vehicle.

Busbars 340 may be disposed on both sides of the heating antenna unit 320. The busbars 340 apply voltage so that the heating antenna unit 320 performs functions as a heating wire. For example, a busbar 340A on the left side plays a role as a negative electrode, and a busbar 340B on the right side may play a role as a positive electrode, or vice versa.

The busbars 340 shown in the drawings are extendedly formed in an up and down direction, but the extension direction and placement method for the busbars 340 are not limited by the disclosure of the drawings.

Referring to FIG. 3, the camera module 390 is configured to take a picture an area outside of the vehicle. Here, the glass 301 of the vehicle is a rear glass, and the camera module 390 takes a picture of an area in rear direction of a vehicle to provide visual information to a passenger.

The optical axis ax1 of the camera module 390 may be disposed to pass through the transparent antenna unit 310. In the case of the first embodiment, the optical axis ax1 of the camera module 390 may be disposed to pass through any one of the first transparent conductive pattern 313 and the second transparent conductive pattern 314 of the plurality of the transparent conductive patterns. That is, a light path of light incident onto a lens of the camera module 390 forms a passage which passes through the transparent conductive pattern of the transparent antenna unit 310, so that the view of the camera module 390 is not disturbed by the components of the glass antenna 300 for the vehicle. Although the optical axis ax1 of the camera module 390 disclosed in FIG. 3 is shown to pass the first transparent conductive pattern 313, it is also possible to dispose the optical axis ax1 to pass not the first transparent conductive pattern 313 but the second transparent conductive pattern 314. That is, in order not to disturb the view of the camera module 390, the optical axis ax1 of the camera module 390 may be designed to pass through any one of the plurality of transparent conductive patterns 313 and 314. FIG. 3 only shows the first embodiment, but also in the second embodiment and the third embodiment, the optical axis ax1 of the camera module 390 may be disposed to pass through the transparent antenna units 410 and 510.

Hereinafter, the second embodiment and the third embodiment are described. In explaining the second embodiment and the third embodiment, a description of any redundant part described in the first embodiment will be omitted.

Figure 4:
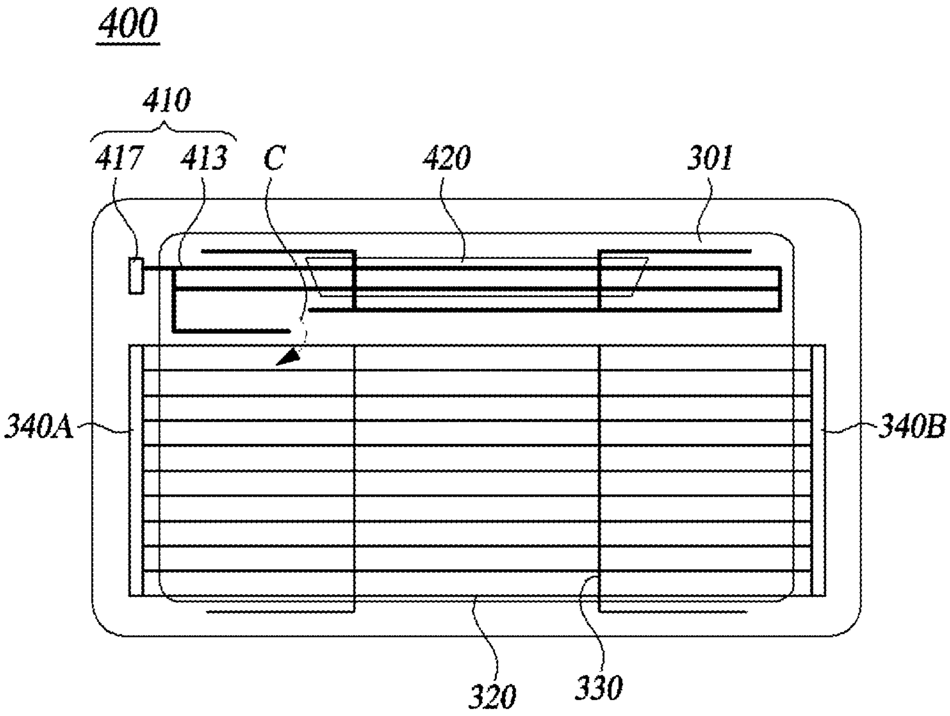
FIG. 4 is a diagram illustrating the structure of a glass antenna according to a second embodiment of the present disclosure.

FIG. 4 is a diagram illustrating the structure of a glass antenna according to the second embodiment of the present disclosure.

Referring to FIG. 4, the glass antenna 400 for a vehicle according to the second embodiment of the present disclosure may include a transparent antenna unit 410, a heating antenna unit 320, a plurality of vertical patterns 330, busbars 340 and a camera module 390 from FIG. 3. In the second embodiment, unlike the first, there are a single transparent conductive pattern 413 and a single feeding unit 417.

The transparent antenna unit 410 may be transparently formed to allow light to pass therethrough. The transparent antenna unit 410 may include one transparent conductive pattern 413 which is of an integrated type.

The transparent antenna unit 410 is disposed on a side of the transparent conductive pattern 413, and may include one feeding unit 417 which is connected to the transparent conductive pattern 413.

The one feeding unit 417 may be disposed on the upper left side of the glass 301. The one feeding unit 417 may be disposed on the same straight line with the busbar 340A on the left side.

The heating antenna unit 320 may include a plurality of heating conductive patterns.

Part of the lower portion of the one transparent conductive pattern 413 may be parallel to the plurality of heating conductive patterns each other. In the parts which are parallel to each other, a capacitive coupling C may occur. Between the configurations which are capacitively coupled, energy may be transmitted by mutual operations without direct contact. That is, non-contact power transmission is possible. The heating antenna unit 320 may be supplied with power by means of coupling with the transparent antenna unit 410.

In the case of the second embodiment, although a roof antenna may not also be included, it is also possible to further include the roof antenna 100 of FIG. 1, which is disposed on the roof of the vehicle. As such, when the roof antenna 100 is included, the roof antenna 100 receives FM1 and DMB/DAB, and the transparent conductive pattern 413 may receive AM and FM2. Here, FM1 and FM2 are FM broadcast waves having different frequency bands from each other.

Figure 5:
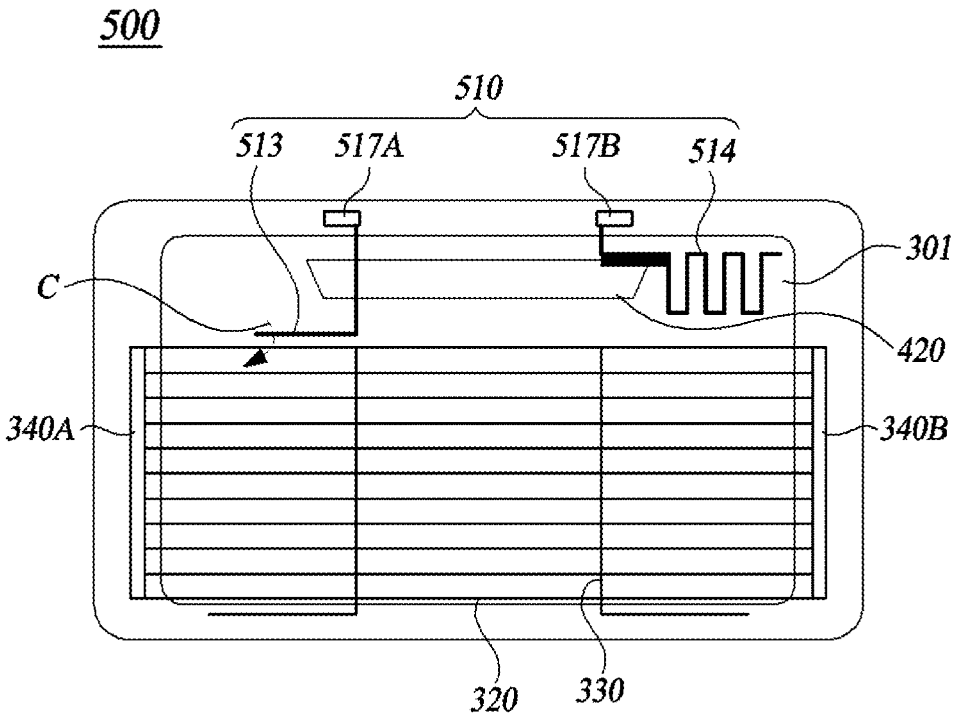
FIG. 5 is a diagram illustrating the structure of a glass antenna according to a third embodiment of the present disclosure.

FIG. 5 is a diagram illustrating the structure of a glass antenna according to the third embodiment of the present disclosure.

Referring to FIG. 5, the glass antenna 500 for a vehicle according to the third embodiment of the present disclosure may include a transparent antenna unit 510, a heating antenna unit 320, a plurality of vertical patterns 330, busbars 340 and a camera module 390 from FIG. 3.

In the third embodiment, two transparent conductive patterns 513 and 514 may be included. Different from the first embodiment, in the third embodiment, each one of the transparent conductive patterns 513 and 514 are disposed on the left side and on the right side of the glass 301, respectively. The transparent conductive patterns 513 and 514 are transparently formed to allow light to pass therethrough. Each of the one upper end of the first transparent conductive pattern 513 and the one upper end of the second transparent conductive pattern 514 are connected to each of a plurality of feeding units 517A and 517B. The each of the plurality of feeding units 517 may be elongated in a direction perpendicular to an extension direction of busbars 340.

The heating antenna unit 320 may include a plurality of heating conductive patterns.

Part of the lower portion of the first transparent conductive pattern 513 may be parallel to the plurality of heating conductive patterns each other. Between the parts which are parallel to each other, a capacitive coupling C may occur. Between the configurations which are capacitively coupled, energy may be transmitted by mutual operations without directly contacting each other. That is, non-contact power transmission is possible. The heating antenna unit 320 may be supplied power by means of coupling with the transparent antenna unit 510.

In the case of the third embodiment, although a roof antenna may not also be included, it is also possible to configure further including a roof antenna 100 from FIG. 1 which is disposed on the roof of the vehicle. Similarly, when the roof antenna 100 is included, it receives AM and FM1 signals. The first transparent conductive pattern 513 receives FM2, and the second transparent conductive pattern 514 may receive DMB/DAB. Here, FM1 and FM2 are FM broadcast waves with different frequency bands.

Unlike the related art, the glass antennas 300, 400 and 500 according to various embodiments of the present disclosure may include transparent antenna units 310, 410 and 510 which include transparent conductive patterns on an upper portion of the glass 301 of the vehicle. That is, unlike the related art which does not make use of the upper portion of the glass 301 of the vehicle as an antenna, the glass antennas 300, 400 and 500 according to various embodiments of the present disclosure, also make use of the upper portion of the glass 301 of a vehicle as an antenna, so that the overall area of the glass 301 of the vehicle may be used as an antenna. It is because the transparent antenna units according to various embodiments of the present disclosure do not block a first area 420. Here, the first area 420 means an area of the glass 301 corresponding to a position of a high mount stop lamp (HMSL) and/or a camera module 390. Since light can pass through the transparent antenna unit, the presence of the transparent antenna unit in the first area 420 does not block the high mount stop lamp (HMSL) and/or the camera module 390 are not blocked, nor does it interfere with operations thereof.

That is, unlike the related art where the design area of an antenna is limited, the glass antennas 300, 400 and 500 according to the present disclosure have an increased total area where an antenna can be configured by the transparent antenna units 310, 410 and 510. Since the transparent antenna unit takes in charge of the communication at specific frequency bands, the transparent antenna unit may perform all or some of the functions among the functions of the roof antenna 100 of FIG. 1. Accordingly, the roof antenna is removed or reduced in size. In a case where the roof antenna is removed or reduced in size, the overall aesthetic appearance of the vehicle improves. In addition, since wireless communication required for a vehicle at various frequency bands may be implemented using minimum components, the manufacturing cost is reduced.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A glass antenna comprising:

a transparent antenna unit formed on an upper portion of a glass for a vehicle and configured allow light to pass therethrough;

a heating antenna unit formed to be spaced at a predetermined distance apart from a lower portion of the transparent antenna unit and configured to be capacitively coupled with the transparent antenna unit; and a plurality of vertical patterns which intersect with the heating antenna unit, wherein the transparent antenna unit comprises:

a first transparent conductive pattern;

a second transparent conductive pattern having a pattern different from that of the first transparent conductive pattern, and a plurality of feeding units, each respectively connected to an upper end of the first transparent conductive pattern and an upper end of the second transparent conducting pattern;

wherein the first transparent conductive pattern overlaps at least a portion of a left side of the first area and the second transparent conductive pattern overlaps at least a portion of a right side of the first area, wherein the heating antenna unit comprises a heating conductive pattern; and wherein a part of a lower portion of the first transparent conductive pattern is parallel to the heating conductive pattern and is disposed closer to the heating conductive pattern than a lower portion of the second transparent conductive pattern, and is capacitively coupled with the heating conductive pattern.

2. The glass antenna of claim 1, wherein the first transparent conductive pattern and the second transparent conductive pattern are capacitively coupled with each other.

3. The glass antenna of claim 1, wherein the first transparent conductive pattern that is configured to receive FM broadcast waves; and wherein the second transparent conductive pattern that is configured to receive AM broadcast waves.

4. The glass antenna of claim 1, wherein the first transparent conductive patterns, the second conductive pattern, and the heating conductive pattern are formed of a same metal.

5. The glass antenna of claim 1, further comprising the camera module, wherein an optical axis of the camera module passes through at least one of the first area, the first transparent conductive pattern, or the second conductive transparent pattern.

6. The glass antenna of claim 1, wherein the heating conductive pattern is transparently formed to allow light to pass therethrough.

7. The glass antenna of claim 1, further comprising the camera module, wherein the plurality of feeding units is placed at a predetermined distance apart from an optical axis of the camera module.

8. The glass antenna of claim 1, further comprising a pair of busbars.

9. The glass antenna of claim 8, wherein the pair of busbars are disposed on both sides of the heating antenna unit.

10. The glass antenna of claim 1, wherein all or some of the plurality of vertical patterns and/or the heating antenna unit are transparently formed.

11. The glass antenna of claim 1, wherein each of the plurality of vertical patterns comprises an extension portion extending in a direction parallel to the heating conductive pattern at a lower end of each vertical pattern; and wherein a length of the part of the lower portion of the first transparent conductive pattern parallel to the heating conductive pattern is shorter than a length of the extension portion.

* * * * *